United States Patent Office 3,769,401
Patented Oct. 30, 1973

3,769,401
CHEMICAL PROCESS
Lloyd M. Thompson, Pointe Claire, Quebec, Canada, assignor to Charles E. Frosst & Co., Kirkland, Quebec, Canada
No Drawing. Filed Nov. 19, 1970, Ser. No. 91,200
Int. Cl. A61k 17/00
U.S. Cl. 424—100                    8 Claims

ABSTRACT OF THE DISCLOSURE

The invention disclosed herein relates to a novel process for the isolation and purification of conjugated estrogens by bringing equine pregnancy urine or, alternatively, an aqueous extract derived from equine pregnancy urine or, alternatively, an aqueous extract derived from equine pregnancy urine, into contact with an anion exchange resin, thereby absorbing said conjugated estrogens on said resin, and eluting the resin with an aqueous alcohol eluting solvent containing chloride ions. Conjugated estrogens derived from equine pregnancy urine (PMU) have been used for many years in estrogenic preparations.

---

Conjugated estrogens have been previously isolated by extracting PMU with an organic solvent such as N-butanol or instead by adsorption on charcoal. Such methods have involved a multiplicity of individual process operations, involving back extraction and repeated transfer between butanol and aqueous solutions. In accordance with the present invention, it has been discovered that conjugated estrogens can be adsorbed directly from PMU, or from aqueous or alcoholic extracts thereof, utilizing an anion-exchange resin as the adsorbent. As the anion-exchange resin, it is ordinarily preferred to employ a polyamine type resin such as Dowex 1-X-2, manufactured by the Dow Chemical Company. Dowex 1-X-2 resin is described in the publication, the Merck Index, eighth edition, published in 1968 (Merck & Co., Inc., Rahway N.J.), as follows: "Cholestyramine Resin. Dowex 1-X2-Cl.; Cuemid; Questran. A synthetic, strongly basic anion exchange resin containing quaternary ammonium functional groups which are attached to a styrene-divinylbenzene copolymer. Main constituent: Polystyrene trimethylbenzylammonium as Cl⁻ anion, also contains divinyl-benzene (about 2%) and water (about 43%). Cross linkage percent: 1–10." The PMU, or aqueous solution containing conjugated estrogens, is contaced with the anion-exchange resin, either by agitating the resin in contact with the conjugated estrogen-containing solution, or by passing such conjugated estrogen-containing solution through a column of said resin. Irrespective of the absorption technique employed, the conjugated estrogen-polyamine resin adsorbate is washed with water and/or aqueous alcohol solution, and then eluted with an aqueous alcohol solution containing chloride ions. This elution procedure is is ordinarily conducted by adding the eluting solvent dropwise to a column of the resin-adsorbate. It is preferred to employ, as the aqueous alcohol eluting solvent containing chloride ions, aqueous methanolic sodium chloride solution, containing approximately 7 parts methanol and 3 parts of 5% aqueous sodium chloride, aqueous methanolic ammonium chloride solution containing approximately 7 parts methanol and 3 parts of 5% aqueous ammonium chloride; and the like. The aqueous alcoholic eluant is then distilled under reduced pressure whereby the alcohol, more particular the methanol, component is evaporated to form a solution of the conjugated estrogens in aqueous sodium chloride or aqueous ammonium chloride, or the solution may be evaporated to dryness thereby obtaining said conjugated estrogens in solid form.

The following examples illustrate methods of carrying out the present invention, but it is to be understood that these examples are given for purposes of illustration and not of limitation.

EXAMPLE 1

Approximately 50 ml. of a polyamine anion-exchange resin manufactured by the Dow Chemical Company, and designated "Dowex 1–X–2 resin" is suspended in 250 ml. of a 50% saturated aqueous solution of sodium chloride, and the suspension stirred for about two hours. The resin is recovered by filtration and washed with 100 ml. of a 5% aqueous solution of sodium chloride. About 50 ml. of this wet Dowex 1–X–2 resin is added to 2230 ml. of equine pregnancy urine containing approximately 176.5 mg. of conjugated estrogens. This mixture is stirred for a period of about 4 hours, during which time the conjugated estrogens are adsorbed on the resin. The suspension is filtered, and the resin is washed, first with 200 ml. of water, and then with 200 ml. of 70% aqueous methanol. About 600 ml. of an aqueous methanolic sodium chloride solution containing 7 parts of methanol and 3 parts of 5% aqueous sodium chloride is added dropwise to the resin-adsorbate on the filter, thereby eluting the conjugated estrogens adsorbed thereon, to produce an eluant containing approximately 124 mg. of conjugated estrogens; recovery yield approximately 70%.

EXAMPLE 2

A column of approximately 50 ml. of Dowex 1–X–2 resin is conditioned by the dropwise addition of 250 ml. of a 5% aqueous solution of sodium chloride, followed by 300 ml. of water, and then by 100 ml. of 50% aqueous methanol solution. To the resulting resin column is then added, dropwise, a 50% aqueous-methanol solution containing 660 mg. of equine conjugated estrogen, whereupon the conjugated estrogen material is adsorbed on the resin. The resin-adsorbate is washed with aqueous methanol, and eluted with an aqueous methanolic sodium chloride solution containing 7 parts of methanol and 3 parts of aqueous 5% sodium chloride solution, thereby eluting conjugated estrogen material from said resin-adsorbate to form an eluant containing about 600 mg. of conjugated estrogen material.

EXAMPLE 3

A column of about 25 ml. of Dowex 1–X–2 resin is conditioned by the dropwise addition of 200 ml. of 2% aqueous sodium chloride solution. To the resulting resin-column is then added, dropwise, 150 ml. of an 0.1% aqueous solution of sodium estrone sulfate (containing 150 mg. of sodium estrone sulfate), whereupon the estrone sulfate is adsorbed on the resin. The resin-adsorbate is washed first with water, and then with 2% aqueous ammonium chloride solution. The washed resin-adsorbate is eluted by the dropwise addition of eight 75 ml.-portions of an aqueous methanolic ammonium chloride solution containing 7 parts of methanol and 3 parts of 5% aqueous ammonium chloride solution. These eight fractions contain about 139 mg. of estrone sulfate, representing a recovery yield of about 93%; the bulk of the estrone sulfate is found in the first 4 fractions

EXAMPLE 4

A column of about 25 ml. of Dowex 1–X–2 resin is conditioned by the dropwise addition of 200 ml. of 2% aqueous sodium chloride solution. To the resulting resin-column is then added dropwise 150 ml. of an 0.1% aqueous solution of sodium estrone sulfate containing 150 mg. of sodium estrone sulfate), whereupon the estrone sulfate is adsorbed on the resin. The resin-adsorbate is washed first with 1% aqueous sodium hydroxide solution, and then with a 2% aqueous solution of sodium chloride. The washed resin-adsorbate is eluted with about 600 ml. aqueous methanolic sodium chloride solution containing 7 parts of methanol and 3 parts of 5% aqueous sodium chloride solution, thereby forming an eluant containing about 143 mg. of sodium estrone sulfate; recovery yield approximately 95%.

Various changes and modifications may be made in carrying out the present invention without departing from the spirit and scope thereof. Insofar as these changes and modifications are within the scope of the appended claims, so they are to be considered as part of this invention.

What is claimed is:

1. The process for the isolation and purification of conjugated estrogens which comprises contacting a strongly basic anion exchange resin (which has previously been wetted by suspending the resin in an aqueous solution of sodium chloride, recovering the resin by filtration, and washing the latter with an aqueous solution of sodium chloride) with an aqueous extract derived from equine pregnancy urine and containing conjugated estrogenic substances, thereby adsorbing said conjugated estrogenic substances on said resin, and contacting the resulting resin-adsorbate with an aqueous alcoholic eluting solvent containing sodium or ammonium chloride thereby eluting said estrogenic substances from said resin-adsorbate.

2. The process as defined in claim 1 in which the estrogenic substance contains sodium estrone sulfate.

3. The process as defined in claim 1 in which the estrogenic substance comprises conjugated estrogens from equine pregnancy urine, the strongly basic anion exchange resin is cholestyramine resin, and the resin-adsorbate is eluted with an aqueous methanolic sodium chloride solution.

4. The process as defined in claim 3 in which the aqueous methanolic sodium chloride solution contains about 7 parts of methanol and about 3 parts of a 5% aqueous sodium chloride solution.

5. The process as defined in claim 1 in which the aqueous solution of estrogenic substance comprises equine pregnancy urine containing conjugated estrogens, the strongly basic anion exchange resin is cholestyramine resin, and the aqueous alcoholic eluting solvent is aqueous methanolic sodium chloride solution containing about 7 parts of methanol and about 3 parts of 5% aqueous sodium chloride solution.

6. The process as defined in claim 1 in which the aqueous solution of estrogenic substance is an aqueous methanolic solution of equine conjugated estrogens, the strongly basic anion exchange resin is cholestyramine resin, and the aqueous alcoholic eluting solvent is aqueous methanolic sodium chloride solution.

7. The process as defined in claim 1 in which the estrogenic substance contains sodium estrone sulfate, the strongly basic anion exchange resin is cholestyramine resin, and the aqueous alcoholic eluting solvent is selected from the group consisting of aqueous methanolic ammonium chloride solution and aqueous methanolic sodium chloride solution.

8. The process as defined in claim 7, in which the aqueous alcoholic eluting solvent is an aqueous methanolic ammonium chloride solution containing about 7 parts of methanol and about 3 parts of 5% aqueous ammonium chloride solution.

References Cited

UNITED STATES PATENTS

| | | | |
|---|---|---|---|
| 2,720,483 | 10/1955 | Stiller et al. | 424—100 |
| 2,375,979 | 5/1945 | Doisy et al. | 424—100 |
| 3,457,346 | 7/1969 | Hell | 424—100 |
| 2,649,399 | 8/1953 | Beall et al. | 424—99 |
| 2,987,441 | 6/1961 | Brudney | 424—79 |
| 2,834,712 | 5/1958 | Beall et al. | 424—100 |
| 2,519,516 | 8/1950 | Turner et al. | 424—100 |
| 2,551,205 | 5/1951 | Cook et al. | 424—99 X |

OTHER REFERENCES

Gaudry et al.: Steroidal "Fraction From Pregnant Mares' Urine" (in French) in compte-Rende DU XXXI Congress Internationale Chimie Industriell Liegf, September 1958 (16 pp.).

SHEP K. ROSE, Primary Examiner

U.S. Cl. X.R.

424—239